United States Patent [19]
Bhatia

[11] Patent Number: 5,434,239
[45] Date of Patent: Jul. 18, 1995

[54] CONTINUOUS POLYESTER PROCESS
[75] Inventor: Kamlesh K. Bhatia, Newark, Del.
[73] Assignee: E. I. Du Pont de Nemours and Company, Wilmington, Del.
[21] Appl. No.: 138,312
[22] Filed: Oct. 18, 1983
[51] Int. Cl.$^6$ .............................................. C08G 63/78
[52] U.S. Cl. .................................. 528/274; 528/272; 528/279; 528/283; 528/285; 528/308.3; 528/308.6; 528/481; 528/489; 528/491; 528/492; 528/503
[58] Field of Search ............... 528/272, 274, 279, 283, 528/285, 489, 481, 491, 492, 503, 308.3, 308.6

[56] References Cited
U.S. PATENT DOCUMENTS

| | | | |
|---|---|---|---|
| 2,578,660 | 12/1951 | Auspos et al. | 528/276 |
| 2,647,885 | 8/1953 | Billica | 528/285 |
| 2,789,972 | 4/1957 | Reynolds et al. | 528/370 |
| 2,973,341 | 2/1961 | Hippe et al. | 526/65 |
| 3,110,547 | 11/1963 | Emmert | 264/211.17 |
| 3,390,135 | 6/1968 | Seiner | 526/64 |
| 3,469,618 | 9/1969 | Siclari et al. | 159/48.2 |
| 3,545,520 | 12/1970 | Siclari et al. | 159/4.04 |
| 3,594,356 | 7/1971 | Hinton | 528/483 |
| 4,835,293 | 5/1989 | Bhatia | 549/274 |

Primary Examiner—Samuel A. Acquah

[57] ABSTRACT

An atmospheric pressure process for the continuous production of polyester is disclosed wherein a melt of dihydroxy ethyl terphthalate, or its low molecular oligomers, obtained by esterifying terephthalic acid or transesterifying dimethyl terephthalate with ethylene glycol, is intimately contacted with an inert gas to facilitate polymerization and removal of the reaction by-products. The ethylene glycol evolved and the inert gas are recycled.

12 Claims, 1 Drawing Sheet

CONTINUOUS POLYESTER PROCESS

FIELD OF THE INVENTION

An improved process for the continuous production of polyester at atmospheric pressure is disclosed.

TECHNICAL BACKGROUND

Polyester production from terephthalic acid (TPA) or its esters, such as dimethyl terephthalate (DMT), and glycols is known. This has been accomplished by stagewise melt polymerization of the dihydroxy ester of the bifunctional carboxylic acid, or low molecular weight oligomers, thereof under successively higher vacuum conditions. In order for the polymerization to continue to the degree needed for most commercial applications, the condensation by-products, especially ethylene glycol, must be removed from the reaction system at vacuums as high as 1–3 mm Hg. Such processes require costly high vacuum equipment, multistage steam jets to create the vacuum, and $N_2$ purged seals and flanges to minimize leakage of air into the system. Condensate from the steam jets and organic by-products from the system end up as a waste water stream that requires treatment and contributes to volatile organic emissions to the air. The present invention provides a less costly polymerization process that can be carried out at atmospheric pressure and in a closed loop configuration that eliminates volatile organic emissions and the waste water discharge.

U.S. Pat. No. 2,973,341 (Hippe) discloses a continuous process for the production of polyester condensate and an improved continuous process for making polyethylene terephthalate from dimethyl terephthalate and ethylene glycol. The process employs liquid dimethyl terephthalate and mixes with it ethylene glycol, in an excess molar ratio of 1.5:1, to form a liquid reaction mixture in a first stage below the transesterification temperature and then carrying the liquid reaction mixture through three separate temperature controlled stages. Transesterification occurs in the second stage at a temperature of not more than 197° C.; vaporous reaction products are removed in the third stage at 197° C. to 230° C. by passing an inert gas through the liquid reaction mixture; polycondensation occurs in the fourth stage at 230° C. to 270° C. for a period of time sufficient to produce a filament forming polyethylene terephthalate condensate while again passing an inert gas through the liquid reaction mixture. Ethylene glycol by-product can be recovered from the fourth stage and recycled to the second stage of the reaction.

U.S. Pat. No. 3,545,520 (Siclari et al.) discloses an apparatus for stripping substances and lightweight fractions from polymers including a means for introducing an inert gas counter current to the polymeric material with the consequent increase in viscosity of the polymers. The apparatus permits recycling a portion of the material removed from the vessel so that the material can be recycled into the reaction container.

U.S. Pat. No. 3,469,618 (Siclari et al.) discloses a method for stripping off volatile fractions from polyamides and polyesters involving feeding material in the form of droplets or liquid threads though an inert gaseous atmosphere, while recirculating that atmosphere.

U.S. Pat. No. 3,110,547 (Emmert) discloses a process for preparing a linear condensation polyester. In one embodiment of the invention, the polymer is extruded downwardly through a chamber while passing a current of inert gas,, such as nitrogen, through the reaction vessel at a rate sufficient to keep the glycol partial pressure below 2 mm Hg while maintaining a temperature between 300° C. and 400° C. in order to rapidly finish the polymer by converting the polymer having a degree of polymerization of from about 15 to 35 to a finished polymer with a degree of polymerization of about 70.

U.S. Pat. No. 3,390,135 (Seiner) discloses a continuous process for preparing polyester wherein the product is contacted with an inert gas which has been passed over the product in a countercurrent manner, at a regulated flow, to remove the water of esterification.

SUMMARY OF THE INVENTION

The invention relates to a continuous atmospheric pressure method of polymerizing a dihydroxy ester of a bifunctional carboxylic acid, or of a low molecular weight polymerizable oligomer thereof, to a product with a higher degree of polymerization (DP), in the presence of a polyester polymerization catalyst, wherein by-products of the polymerization are removed from the system by means of an inert gas.

This process provides an improved method for producing linear aromatic polyesters, especially polyethylene terephthalate (PET), also referred to as polyethylene glycol terephthalate. The bifunctional acid in the production of PET is terephthalic acid (TPA). The process involves the continuous production of polyethylene terephthalate from terephthalic acid and ethylene glycol by esterification, or from dimethyl terephthalate and ethylene glycol by a transesterification stage, followed by polycondensation and polymer finishing stages. The process is conducted at atmospheric pressure or above, thereby avoiding high vacuum equipment and eliminating possible air contamination that causes product decomposition and gel formation. The process comprises the following steps:

(a) esterifying terephthalic acid or transesterifying dimethyl terephthalate with ethylene glycol to produce dihydroxy ethyl terphthalate or its low molecular oligomers, and (b) intimately contacting dihydroxy ethyl terephthalate, or its low molecular weight oligomers, in melt form, with an inert gas at a velocity of 0.2 to 5 ft/sec, so that volatile reaction by-products are removed continuously by the inert gas and wherein the polymerization product is removed continuously, while the reactants are kept at a suitable temperature to maintain the melt and to continue polymerization. The above processes are conducted in the presence of a polyester polymerization catalyst.

In a preferred embodiment of the invention, a single stream of inert gas is recycled through a polymer finishing stage, a polycondensation stage and a stage wherein ethylene glycol is recovered for reuse in the process.

DETAILED DESCRIPTION OF THE INVENTION

Figure 2:
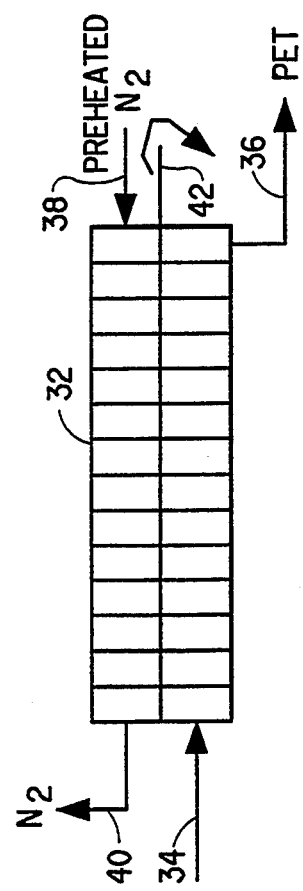
FIG. 2 represents one apparatus which is suitable for carrying out the continuous polymerization of the invention, wherein material having a lower degree of polymerization is converted to material having a higher degree of polymerization.

Polyethylene terephthalate is manufactured in this process by first reacting terephthalic acid (TPA) or dimethyl terephthalate (DMT) with ethylene glycol. If DMT is the starting material, a suitable transesterification catalyst such as zinc or manganese acetate is used for the reaction. Esterified DMT/TPA is polymerized as a melt at atmospheric pressure or above by intimately contacting the melt with a stream of inert gas (for example, but not limited to, $N_2$ or $CO_2$) to remove the condensation by-products, mainly, ethylene glycol. Preferably, the inert gas is preheated to about polymerization temperature or above, prior to its introduction into the polymerization equipment. It is preferred that the inert gas velocity through the polymerization equipment be in the range of 0.2 to 5 ft./sec., most preferably 0.5 to 2 ft/sec, flowing counter currently to the flow of the melt. The vapor leaving the polymerization equipment (after a finishing stage and a polycondensation stage) is fractionated to recover ethylene glycol for recycle. The nitrogen stream is then cleaned up and recycled. Thus, the overall process operates as a closed loop system which avoids environmental pollution and integrates ethylene glycol purification and its recycle into the process.

Catalysts for facilitating the polymerization are any one or more polyester polymerization catalysts known in the prior art to catalyze such polymerization processes, such as, but not limited to, compounds of antimony, germanium and titanium. Antimony trioxide ($Sb_2O_3$) is an especially effective catalyst which may be introduced, for convenience, as a glycolate solution in ethylene glycol. Examples of such catalysts are found in U.S. Pat. Nos. 2,578,660, 2,647,885 and 2,789,772, which are incorporated herein by reference.

Dihydroxy esters of bifunctional carboxylic acids used in the processes described herein are monomeric compounds that can polymerize to a polymer. Examples of such compounds are bis(2-hydroxyethyl)terephthalate, bis(4-hydroxybutyl)terephthalate, bis(2-hydroxyethyl) naphthalenedioate, bis(2-hydroxyethyl)isophthalate, bis[2-(2-hydroxyethoxy)ethyl]terephthalate, bis[2-(2-hydroxyethoxy)ethyl]isophthalate, bis[(4-hydroxymethylcyclohexyl)methyl]terephthalate, bis[(4-hydroxymethylcyclohexyl)methyl]isophthalate, and a combination of bis(4-hydroxybutyl) terephthalate and their oligomers. Mixtures of these monomers and oligomers may also be used.

By a "polymerizable oligomer" is meant any oligomeric material which can polymerize to a polyester. This oligomer may contain low molecular weight polyester, and varying amounts of monomer. For example, the reaction of dimethyl terephthalate or terephthalic acid with ethylene glycol, when carried out to remove methyl ester or carboxylic groups usually yields a mixture of bis(2-hydroxyethyl) terephthalate, low molecular weight polymers (oligomers) of bis(2hydroxyethyl) terephthalate and oligomers of mono(2-hydroxyethyl) terephthalate (which contains carbonyl groups). This type of material is referred to herein as "polymerizable oligomer".

Polyesters produced by the process include, but are not limited to, poly(ethylene terephthalate), poly(1,4-butylene terephthalate), poly(ethylene naphthalenedioate), poly(ethylene isophthalate), poly (3-oxa-1,5-pentadiyl terephthalate), poly(3-oxa-1,5-pentadiyl isophthalate), poly[1,4-bis(oxymethyl)cyclohexyl terephthalate] and poly[1,4-bis(oxymethyl)cyclohexyl isophthalate]. Poly(ethylene terephthalate) is is an especially important commercial product.

The process avoids high vacuum polymerization processes characteristic of the conventional art. Advantages of the process are a simpler flow pattern, lower operating costs and the avoidance of steam jets, hot wells and atmosphere emissions. The process also has environmental advantages due to the elimination of volatile organic emissions and waste water discharge. Furthermore, polymerization is conducted in an inert environment. Therefore, there is less decomposition and gel formation which results in better product quality. Ethylene glycol and inert as (e.g., $N_2$ or $CO_2$) are recycled continuously. The process is described in greater detail with reference to FIGS. 1 and 2.

Figure 1:
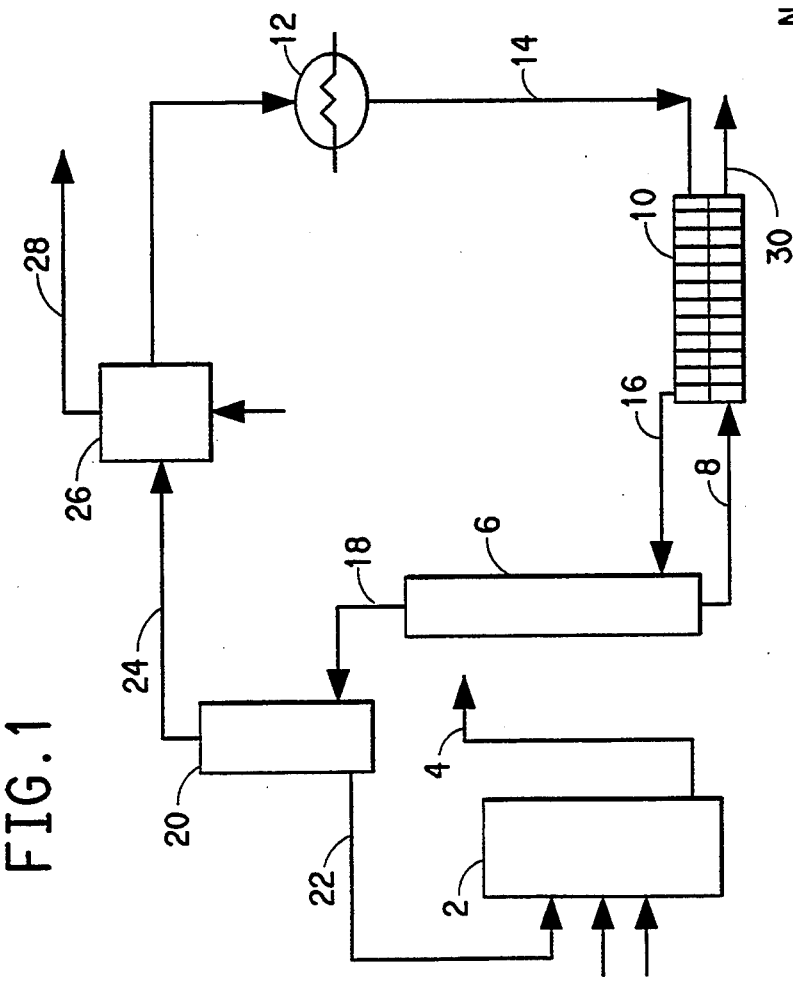
FIG. 1 is a diagrammatic flow sheet for the continuous process of the invention.

FIG. 1 is a diagrammatic flow sheet for the continuous process of the invention. Reactant materials TPA (or its dimethyl ester, DMT) and ethylene glycol are supplied continuously to an esterification column (2) for esterification (or transesterification) to DHET and its low DP oligomers. The resulting esterified or transesterified product is an oligomer with a low degree of polymerization (DP). The resulting DP is from 1-2 if the starting material is DMT. If TPA is the starting material, the resulting oligomer usually has a higher DP, in the range of from about 3-7. The molten reaction product formed in the esterification column (2) is conducted through transfer line (4) to a prepolymerization column (6) for polycondensation. A suitable polyester polymerization catalyst, such as $Sb_2O_3$, may be added at this point. The prepolymer, exiting the esterification column with a degree of polymerization from 15-30, is conducted through transfer line (8) to finisher (10) in order to finish the polymer by raising the degree of polymerization to about 50 to about 150, preferably about 60 to about 100. The finisher (10) is maintained at a temperature greater than about 260° C. but not high enough to result in polymer decomposition. A temperature range of about 270° C. to 300° C. is preferred. The polymerization product is continuously removed from the finisher through line (30). An inert gas, preferably nitrogen, is heated in heater (12) at a temperature of from about 280° C. to 320° C. and is introduced through line (14) into the finisher to flow counter current to the direction of polymer flow in order to remove volatile reaction by-products, primarily ethylene glycol. The inert gas flows through the finisher (10) and then through line (16) to prepolymerization column (6) removing volatile reaction by-products, which are mainly ethylene glycol, in that reaction column. The hot inert gas stream containing organic vapors, which are mainly ethylene glycol with minor amounts of methanol, water, and some thermal decomposition products, exits the prepolymerization column through line (18) and enters the glycol recovery column (20) where glycol is recovered from the stream and refined without the need for additional external heat. The recovered glycol is recycled to the esterification column (2) through line (22). The inert gas stream containing the volatile organics, such as acetaldehyde, exits the glycol recovery column through line (24) and enters an adsorption bed (26), such as an activated carbon bed, wherein the organic volatiles are adsorbed producing a clean nitrogen stream which can be heated and returned to the finisher (10). Thus, the nitrogen is employed in a closed loop and all processing equipment is operated at atmospheric pressure (or above, as is necessary to ensure the flow of nitrogen through the equipment in the loop). The inert gas flowing in the polymerization equipment (6) and (10) has a velocity of between about 0.2 to 5 ft/sec, preferably 0.5 to 2 ft/sec. The quantity of inert gas introduced into the system is sufficient so that the partial pressure of the by-products is maintained below the equilibrium pressure of the by-products with the melt in order to provide for the continuous polymerization. The quantity of inert gas is between about 0.2–0.5 pounds for each pound of polyethyene terephalate produced. The adsorption bed (26) can be purged to remove the adsorbed products. The adsorbed products are transfered by line (28) to a combustion device, such as a boiler, (not shown) where they are converted to carbon dioxide and water by combustion thus completing an environmentally clean, emissions free process.

FIG. 2 illustrates one apparatus which is suitable for carrying out the continuous polymerization of the invention particularly for use with the high viscosity material and degree of polymerization encountered in the finisher (10) of FIG. 1. It consists of a horizontal, agitated cylindrical vessel (32). The esterified DMT or TPA, or a low molecular weight oligomer thereof, is continuously introduced as stream (34) at one end of the vessel (32) and a preheated inert gas, such as nitrogen, is continuously introduced as stream (38) at the other end, so as to provide a counter current flow to the polymer flow nitrogen stream (38) carrying reaction by-product vapors, mostly ethylene glycol, leaves as stream (40). The polymerized product, polyethylene terephthalate, is removed as stream (36). The flow rates of streams (34) and (36) are coordinated to be equivalent to each other and controlled so as to provide the desired inventory of the melt in the finisher, usually about equivalent to 1 to 2 hours times the flow rate, with melt level at about $\frac{1}{3}$ to $\frac{1}{2}$ the height of the vessel. The quantity of nitrogen introduced into the system is sufficient so that the partial pressure of the evolving reaction by-products is maintained at less than the equilibrium pressure of the by-products with the, for example, poly(ethylene)-terephthalate (PET) melt, so as to provide adequate driving force to remove ethylene glycol from the melt into the gas stream. The diameter of the vessel is designed so that the superficial velocity of the inert gas stream is about 0.5 to 2 ft/sec.

The vessel is equipped with an agitator (42) which can be rotated at a controlled speed. The mechanical design of the agitator is such that
(a) the walls o the vessel are wiped;
(b) a large interfacial area of at least 10 ft$^2$/ft$^3$, preferably greater then 30 ft$^2$/ft$^3$, is created;
(c) the surface area is renewed frequently; and
(d) good mixing is provided.

One design which achieves the above specified criteria, is a rotating disc contactor consisting of several discs mounted on a shaft (in a fashion similar to that in conventional continuous polymerizers) but the discs in this design are sieve plates, with large open area, which allow well distributed cross flow of the inert gas vapors.

EXAMPLES 1-9

Examples 1–9 were conducted in a test tube heated to 280° to 295° C. by placing it in a temperature controlled sand bath. The test tub was equipped with means to introduce preheated N$_2$ at a controlled rate near the bottom and an outlet was created near the top of the test tube to allow N$_2$ to exit. Except for Example 9, 5 g samples of monomer, prepared at a DuPont commercial plant site by transesterifying DMT with EG, were placed in the test tube along with 180 to 1600 ppm of antimony, added as a Sb$_2$O$_3$ catalyst. The catalyst level was not found to affect the polymerization rate significantly and higher levels led to greyish discoloration of the product. Therefore, except for Examples 3, 5, and 6 which had catalyst levels of 1600, 400 and 900 ppm, respectively, all other Examples were at lower catalyst levels as shown in Table 1. In Example 9, a 10 g sample was employed and a Mn catalyst used for transesterification was rendered inactive by reacting with phosphoric aid, before adding the antimony catalyst. This also did not effect the kinetics measurably.

In Examples 8 and 9, the temperature was ramped from 230° C. to 285° C. over a 10 to 15 minute period. This allowed the initial polymerization to occur at lower temperatures and minimized volatilization of the low DP oligomers into the N$_2$ stream.

When the monomer melted in the tube, N$_2$ was introduced at a flow rate such that the superficial gas velocity was in the range expected for a commercial scale operation. The nitrogen velocities employed are shown in Table 1. For the examples where a range of velocities is shown, such as 0.2–0.6 ft/sec in Example 9, it means that the velocity was at the lower value at the start of the reaction and gradually increased to the higher value as the polymerization proceeded. N$_2$ was introduced below the melt causing the melt to lift up and allowing it to fall along the tube walls to create interfacial area (estimated at >30 ft$^2$/ft$^3$), and provide surface renewal and good mixing. Experiments were conducted for 12 to 105 minutes and the resulting PET product was analyzed for molecular weight distribution by GPC. The number average degree of polymerization calculated from GPC data for each sample are shown in Table 1. The values were independently confirmed by measurements of intrinsic viscosity.

TABLE 1

| EX-AMPLE | POLYMERI-ZATION Time (Min.) | CATA-LYST ppm Sb | N$_2$ VELOCITY ft./sec. | NO AVG. DP |
|---|---|---|---|---|
| 1 | 12 | 225 | 0.3–0.6 | 24 |
| 2 | 21 | 180 | 0.3–1.0 | 44 |
| 3 | 21 | 1600 | 0.3 | 39 |
| 4 | 39 | 225 | 0.3–1.3 | 54 |
| 5 | 39 | 400 | 0.6 | 54 |
| 6 | 42 | 900 | 0.6 | 57 |
| 7 | 60 | 225 | 0.3–1.0 | 64 |
| 8 | 105 | 200 | 0.2–1.9 | 182 |
| 9 | 90 | 280 | 0.2–0.6 | 70 |

EXAMPLE 10

Polymerization of the same monomer used in Example 9 was studied on a microbalance apparatus in a stream of nitrogen in order to determine the impact of nitrogen velocity on mass transfer. A small sample, 63.6 mg, was suspended in a heated glass tube having a 25 mm inside diameter through which nitrogen flowed at a rate of 330 cc/min. Temperature of the sample was monitored by a thermocouple mounted close to the sample, while controlling the heat input to the glass tube. The progress of polymerization was monitored by observing the weight loss due to the evolution of reaction by-product, ethylene glycol.

The sample was heated to 288° C. and then held at that temperature for 90 minutes while maintaining the nitrogen flow rate. The velocity of nitrogen in the glass tube was calculated as 0.077 ft/sec. Due to the small size of the sample, there was a very large surface to volume ratio, estimated at over 180 ft$^2$/ft$^3$. In spite of such a large area (several times that of Examples 1-9) the rate of polymerization was slow due to the low nitrogen velocity. At the end of 90 minutes the polymer obtained and analyzed by GPC had a number average DP of only about 14. The need for adequate nitrogen velocity was confirmed by this experiment.

EXAMPLE 11

The same monomer used in Example 9 was polymerized in a laboratory apparatus of the type shown in FIG. 2 which was constructed to operate under the conditions disclosed in Example 12 for a commercial scale operation.

The apparatus consisted of a 6 inch glass tube with an inside diameter of 1 inch which was placed in a tube furnace equipped with temperature control. The tube was fitted with an agitator of ⅛ inch diameter coiled aluminum wire which provided mixing, surface renewal and wiping of the inside tube wall. The agitator was rotated by use of a motor having a variable speed gear reducer. It is estimated that the device provided a surface area of about 60 ft$^2$/ft$^3$ of the melt. The polymer melt temperature was monitored by means of a thermocouple inserted into the tube at each of its two ends.

The tube was filled with 37.6 g of monomer and placed in the furnace. The furnace temperature was raised to a sufficient temperature to melt the monomer. When the monomer was molten, the agitator was started and preheated nitrogen was flowed at a velocity of about 0.5 ft/sec through the tube.. The temperature set point was then raised to 290° C. to effect polymerization. When the melt temperature inside the tube reached 290° C., the velocity of the nitrogen was raised to 1.1 ft/sec. Polymerization was continued for 90 minutes while controlling these operations under the above stated conditions. The actual temperature near the nitrogen outlet end varied from around 270° to 299° C. The agitator speed was initiated at 15 RPM, but was reduced to 8 RPM after about 20 minutes and then further reduced to around 3-4 RPM after another 20 minutes as the melt became more viscous.

At the end of 90 minutes of polymerization, two samples of the resulting PET were analyzed by GPC. The number average DP was calculated to be 79 and 89, respectively. This is higher than the typical value required for yarn and staple use.

To check the feasibility of higher nitrogen velocities, the velocity was raised to 1.45 ft/sec during the last 3 minutes of operation. No polymer carryover was observed. Just before shutting down, the velocity was increased to over 3 ft/sec and was found to be feasible.

EXAMPLE 12

Example 12 illustrates the process of the invention for operating continuously a commercial scale of approximately 100 million pounds per year. Referring to FIG. 1, about 12,150 lbs/hr of prepolymer of approximately 20 DP are fed to finisher (10), maintained at between 285°-295° C., and contacted counter currently with a stream of nitrogen heated to about 300° C. and flowed at a rate of 1000 standard cubic feet per minute (SCFM). The flow rate is equivalent to 0.39 of nitrogen per pound of PET produced. The finisher is 7 ft in diameter and 21 ft long. Polyethylene terephthalate, polymerized to a number average DP of 81, is withdrawn at a rate of 12,000 lbs/hr through line (30) while the level in the finisher is controlled such that about ⅓ of the finisher volume remains filled with polymer melt. The melt inventory is thus equivalent to about 100 minutes or 1⅔ hours of PET throughput rate. The finisher (10) is equipped with an agitator to provide an interfacial area of about 50 square feet per cubic foot of the melt. It provides frequent surface renewal and good mixing of the melt. The superficial gas velocity of the nitrogen stream is 1.2 ft/sec under the actual operating conditions. The nitrogen stream leaving the finisher (10) through line (16) contains approximately 150 pounds of the ethylene glycol evolved in the finisher The partial pressure of ethylene glycol in the stream is about 11 mm Hg.

The nitrogen stream leaving the finisher (10) through line (16) is then fed to the prepolymerizer (6) to provide counter current contact with the esterification product of about 1.5 average DP, produced by transesterification of DMT with ethylene glycol, entering the prepolymerizer (6) through line (4) at a rate of about 14,550 pounds/hour.

The prepolymerizer tower is 6 ft in diameter and 30 ft high. The interior of the tower is designed so as to provide intimate staged contact between the melt and the nitrogen vapor such that the hold up time of the melt in that column is about 20 minutes or ⅓ hour. The total time for polymerization, including the 1⅔ hours in the finisher is thus about 2 hours or less. The prepolymerizer is operated at 280° C. A somewhat lower temperature may be maintained at the top of the tower to minimize volatization of the lower molecular weight oligomers. The nitrogen velocity in the prepolymerizer is about 1 ft/sec near the bottom of the tower and about 1.4 ft/sec near the top of the tower.

The hot nitrogen vapors exit the prepolymerizer (6) through line (18) containing about 2550 pound of ethylene glycol, along with small amounts of other components, such as very low DP oligomers, methanol from the end groups left unreacted during transesterification and minute quantities of high volatile organics, such as acetaldehyde, which may be present. The nitrogen stream is fed to the bottom of the ethylene glycol recovery column (20) through line (18). The column is 4 ft in diameter and the nitrogen velocity averages about 1.8 ft/sec. Heat is removed at the top of the column to cool the nitrogen to near the ambient temperature. Essentially all the the ethylene glycol is condensed and leaves the bottom of the column through line (22) as a hot liquid stream of about 150° C. It is recycled through line (22) to the esterification column (2).

The small amount of oligomers entrained with the nitrogen stream leaving the prepolymerizer (6) react with the large excess of glycol at the bottom of the EG recovery column, reverting back to the monomer and are recycled along with the glycol stream to the esterification column. The uncondensed organics, such as acetaldehyde leave the EG recovery column along with nitrogen through line (24) and are fed to an adsorption bed (26) of activated carbon. Volatile organic vapors are absorbed on the bed thus cleaning up the nitrogen stream. The nitrogen stream is heated to about 300° C. and recycled to the finisher. The adsorption bed (26) is periodically purged, when it nears saturation, to remove adsorbed organics which are sent to the boiler house and converted to carbon dioxide and water. A small amount of nitrogen may be purged from the nitrogen loop, and replenished with an equivalent amount of fresh nitrogen to keep the levels of impurities in the loop low. Such a nitrogen purge may be used for the periodic purging of the adsorption bed.

What is claimed is:

1. A process for preparing a linear condensation polyester by the continuous polymerization of a dihydroxy ester of a bifunctional carboxylic acid, or low molecular weight oligomer thereof, with the evolution of volatile reaction by-products including a glycol, to form a product with a higher degree of polymerization, the process conducted at atmospheric pressure or above, comprising contacting the dihydroxy ester of a bifunctional carboxylic acid, or low molecular weight oligomer thereof, in melt form, in the presence of a polyester polymerization catalyst, with an inert gas flowing in the process at a velocity of 0.2 to 5 ft/sec, continuously removing volatile reaction by-products by the inert gas and, removing polymerization product continuously, while the reactants are maintained in melt form.

2. A process for the continuous production of polyethylene terephthalate from terephthalic acid and ethylene glycol by esterification followed by the process stages of polycondensation and polymer finishing, the process conducted at atmospheric pressure or above, comprising:
   (a) esterifying terephthalic acid with ethylene glycol to produce dihydroxy ethyl terphthalate or its low molecular oligomers,
   (b) intimately contacting dihydroxy ethyl terephthalate, or its low molecular weight oligomers, in melt form, with an inert gas flowing in the process at a velocity of 0.2 to 5 ft/sec, so that volatile reaction by-products, including ethylene glycol, by the inert gas which is recycled in the system, and continuously removing the polymerization product, while the reactants are maintained in melt form, said process conducted in the presence of a polyester polymerization catalyst.

3. A process for the continuous production of polyethylene terephthalate from dimethyl terephthalate and ethylene glycol by transesterification followed by the process stages of polycondensation and polymer finishing, the process conducted at atmospheric pressure or above, comprising:
   (a) transesterifying dimethyl terephthalate with ethylene glycol to produce dihydroxy ethyl terphthalate or its low molecular oligomers,
   (b) intimately contacting dihydroxy ethyl terephthalate, or its low molecular weight oligomers, in melt form, with an inert gas flowing in the process at a velocity of 0.2 to 5 ft/sec, continuously removing volatile reaction by-products, including ethylene glycol, by the inert gas which is recycled in the system, and continuously removing the polymerization product, while the reactants are maintained in melt form and the process is conducted in the presence of a polyester polymerization catalyst.

4. The process of claim 1 or claim 2 or claim 3 wherein the catalyst is selected from compounds of antimony, germanium and titanium.

5. The process of claim 1, claim 2 or claim 3 wherein the inert gas is preheated to about polymerization temperature or above polymerization temperature prior to contacting it with the melt.

6. The process of claim 1 or claim 2 or claim 3 wherein the inert gas in the system flows counter current to the flow of the melt.

7. The process of claim 1, claim 2 or claim 3 wherein the quantity of the inert gas introduced into the system is sufficient to keep the partial pressure of the by-products at less than the equilibrium pressure of the by-products with the melt.

8. The process of claim 1, claim 2 or claim 3 wherein the volatile reaction by-products are recovered and the inert gas is continuously recycled for reuse in the process.

9. The process of claim 2 or claim 3 wherein a single stream of inert gas is recycled through the polymer finishing stage, a polycondensation stage and a stage wherein ethylene glycol is recovered for reuse in the process.

10. The process of claim 1 wherein the dihydroxy ester of a bifunctional carboxylic acid is selected from the group consisting of bis(2-hydroxyethyl) terephthalate, bis(4-hydroxybutyl)terephthalate, bis(2-hydroxyethyl) naphthalenedioate, bis(2-hydroxyethyl) isophthalate, bis[2-(2-hydroxyethoxy)ethyl]terephthalate, bis[2-(2-hydroxyethoxy)ethyl]isophthalate, bis[(4-hydroxymethylcyclohexyl)methyl]terephthalate, bis[(4-hydroxymethylcyclohexyl)methyl]isophthalate, bis(4-hydroxybutyl)terephthalate, and oligomers of bis(4-hydroxybutyl)terephthalate.

11. The process of claim 1, 2 or 3 wherein the inert gas is selected from $N_2$ and $CO_2$.

12. The process of claim 2 or claim 3 wherein the temperature of the finishing stage is 270° C. to 300° C.

* * * * *

UNITED STATES PATENT AND TRADEMARK OFFICE
CERTIFICATE OF CORRECTION

PATENT NO. : 5,434,239

DATED : July 18, 1995

INVENTOR(S) : Bhatia et al.

It is certified that error appears in the above-identified patent and that said Letters Patent is hereby corrected as shown below:

On the title page, item [22]:

The filing date should read --Oct. 18, 1993--.

Signed and Sealed this

Sixteenth Day of July, 1996

Attest:

BRUCE LEHMAN

Attesting Officer     Commissioner of Patents and Trademarks